(12) United States Patent
Ng et al.

(10) Patent No.: US 7,739,334 B1
(45) Date of Patent: Jun. 15, 2010

(54) SYSTEM AND METHOD FOR AUTOMATICALLY FORWARDING EMAIL AND EMAIL EVENTS VIA A COMPUTER NETWORK TO A SERVER COMPUTER

(75) Inventors: Mason Ng, Mountain View, CA (US); Daniel J. Mendez, Menlo Park, CA (US); Sean Michael Quinlan, San Francisco, CA (US)

(73) Assignee: Visto Corporation, Redwood City, CA (US)

( * ) Notice: Subject to any disclaimer, the term of this patent is extended or adjusted under 35 U.S.C. 154(b) by 0 days.

(21) Appl. No.: 09/528,363

(22) Filed: Mar. 17, 2000

(51) Int. Cl.
*G06F 15/16* (2006.01)
(52) U.S. Cl. ........................ 709/206; 709/205
(58) Field of Classification Search ................ 709/206, 709/239, 238, 205; 707/10; 379/93.24; 455/466
See application file for complete search history.

(56) References Cited

U.S. PATENT DOCUMENTS

| | | | |
|---|---|---|---|
| 4,714,995 A | 12/1987 | Materna et al. | 364/200 |
| 4,831,582 A | 5/1989 | Miller et al. | 364/900 |
| 4,875,159 A | 10/1989 | Cary et al. | 364/200 |
| 4,897,781 A | 1/1990 | Chang et al. | 364/200 |
| 5,263,157 A | 11/1993 | Janis | 395/600 |
| 5,386,564 A | 1/1995 | Shearer et al. | 395/650 |
| 5,388,255 A | 2/1995 | Pytlik et al. | |
| 5,392,390 A | 2/1995 | Crozier | 395/161 |
| 5,544,320 A | 8/1996 | Konrad | |
| 5,572,643 A | 11/1996 | Judson | 395/793 |
| 5,581,749 A | 12/1996 | Hossain et al. | 395/600 |
| 5,588,132 A | 12/1996 | Cardoza | |
| 5,600,834 A | 2/1997 | Howard | 395/617 |
| 5,613,012 A | 3/1997 | Hoffman et al. | 382/115 |
| 5,623,601 A | 4/1997 | Vu | 395/187.01 |
| 5,627,658 A | 5/1997 | Connors et al. | 358/407 |
| 5,634,053 A | 5/1997 | Noble et al. | 395/604 |
| 5,647,002 A | 7/1997 | Brunson | 380/49 |
| 5,652,884 A | 7/1997 | Palevich | 395/651 |
| 5,664,207 A | 9/1997 | Crumpler et al. | 395/766 |
| 5,666,530 A | 9/1997 | Clark et al. | 395/617 |
| 5,666,553 A | 9/1997 | Crozier | 395/803 |
| 5,678,039 A | 10/1997 | Hinks et al. | 395/604 |

(Continued)

FOREIGN PATENT DOCUMENTS

CA     2210763     2/2000

(Continued)

OTHER PUBLICATIONS

Research Disclosure; "Provide Auto-Forwarding Based on Criteria Selected by the User"; Oct. 1, 1989; 1 page; No. 306; Kenneth Mason Publications; XP000085405; ISSN; 0374-4353.

(Continued)

*Primary Examiner*—Kenny S Lin
(74) *Attorney, Agent, or Firm*—Oblon, Spivak, McClelland, Maier & Neustadt, L.L.P.

(57) ABSTRACT

The system and method enables the automatic routing of email and information corresponding to email to a database. The system and method also enables the filtering of email, determination of a protocol based on the filtering, and the transfer of the email according to the determined protocol.

24 Claims, 8 Drawing Sheets

U.S. PATENT DOCUMENTS

| | | | |
|---|---|---|---|
| 5,680,542 A | 10/1997 | Mulchandani et al. | 395/183.04 |
| 5,682,524 A | 10/1997 | Freund et al. | 395/605 |
| 5,684,984 A | 11/1997 | Jones et al. | 395/610 |
| 5,684,990 A | 11/1997 | Boothby | 395/619 |
| 5,687,322 A | 11/1997 | Deaton | 395/214 |
| 5,701,400 A | 12/1997 | Amado | 395/76 |
| 5,701,423 A | 12/1997 | Crozier | 395/335 |
| 5,706,502 A | 1/1998 | Foley et al. | 395/610 |
| 5,710,918 A | 1/1998 | Lagarde et al. | 395/610 |
| 5,713,019 A | 1/1998 | Keaten | 395/610 |
| 5,715,403 A | 2/1998 | Stefik | 395/244 |
| 5,717,925 A | 2/1998 | Harper et al. | 395/613 |
| 5,721,908 A | 2/1998 | Lagarde et al. | 395/610 |
| 5,721,914 A | 2/1998 | DeVries | 395/615 |
| 5,729,735 A | 3/1998 | Meyering | 395/610 |
| 5,745,360 A | 4/1998 | Leone et al. | 364/140 |
| 5,752,246 A | 5/1998 | Rogers et al. | |
| 5,757,916 A | 5/1998 | MacDoran et al. | 380/25 |
| 5,758,150 A | 5/1998 | Bell et al. | 395/610 |
| 5,758,354 A | 5/1998 | Huang et al. | 707/201 |
| 5,758,355 A | 5/1998 | Buchanan | 707/201 |
| 5,764,902 A | 6/1998 | Rothrock | |
| 5,765,171 A | 6/1998 | Gehani et al. | 707/203 |
| 5,778,346 A | 7/1998 | Frid-Nielsen et al. | 395/208 |
| 5,790,425 A | 8/1998 | Wagle | 364/551.01 |
| 5,790,790 A | 8/1998 | Smith et al. | 395/200.36 |
| 5,799,318 A | 8/1998 | Cardinal et al. | 707/104 |
| 5,812,773 A | 9/1998 | Norin | |
| 5,832,483 A | 11/1998 | Barker | 707/8 |
| 5,835,601 A | 11/1998 | Shimbo et al. | |
| 5,862,325 A | 1/1999 | Reed | 395/200.31 |
| 5,862,346 A | 1/1999 | Kley et al. | |
| 5,870,759 A | 2/1999 | Bauer et al. | 707/201 |
| 5,878,230 A * | 3/1999 | Weber et al. | 709/238 |
| 5,918,158 A * | 6/1999 | LaPorta et al. | 340/7.29 |
| 5,924,103 A | 7/1999 | Ahmed et al. | |
| 5,928,329 A | 7/1999 | Clark et al. | |
| 5,943,676 A | 8/1999 | Boothby | |
| 5,951,652 A | 9/1999 | Ingrassia et al. | 709/248 |
| 5,961,590 A | 10/1999 | Mendez et al. | |
| 5,966,714 A | 10/1999 | Huang et al. | 707/201 |
| 5,968,131 A | 10/1999 | Mendez et al. | |
| 5,974,238 A | 10/1999 | Chase, Jr. | |
| 5,999,932 A * | 12/1999 | Paul | 707/10 |
| 5,999,947 A | 12/1999 | Zollinger et al. | 707/203 |
| 6,020,885 A | 2/2000 | Honda | |
| 6,021,427 A | 2/2000 | Spagna et al. | |
| 6,023,700 A * | 2/2000 | Owens et al. | 707/10 |
| 6,023,708 A | 2/2000 | Mendez et al. | |
| 6,029,164 A * | 2/2000 | Birrell et al. | 707/3 |
| 6,034,621 A | 3/2000 | Kaufman | |
| 6,073,165 A * | 6/2000 | Narasimhan et al. | 709/206 |
| 6,085,192 A | 7/2000 | Mendez et al. | |
| 6,094,477 A * | 7/2000 | Nada et al. | 379/93.24 |
| 6,108,709 A * | 8/2000 | Shinomura et al. | 709/239 |
| 6,118,856 A * | 9/2000 | Paarsmarkt et al. | 379/93.24 |
| 6,125,281 A * | 9/2000 | Wells et al. | 455/466 |
| 6,131,096 A | 10/2000 | Ng et al. | |
| 6,131,116 A | 10/2000 | Riggins et al. | |
| 6,138,146 A * | 10/2000 | Moon et al. | 709/206 |
| 6,151,606 A | 11/2000 | Mendez | |
| 6,212,529 B1 | 4/2001 | Boothby et al. | |
| 6,249,805 B1 * | 6/2001 | Fleming, III | 709/206 |
| 6,295,541 B1 | 9/2001 | Bodnar et al. | |
| 6,343,313 B1 | 1/2002 | Salesky et al. | |
| 6,374,300 B2 * | 4/2002 | Masters | 709/229 |
| 6,442,589 B1 * | 8/2002 | Takahashi et al. | 709/203 |
| 6,446,118 B1 * | 9/2002 | Gottlieb | 709/217 |
| 6,457,062 B1 * | 9/2002 | Pivowar et al. | 709/248 |
| 6,477,545 B1 | 11/2002 | LaRue | |
| 6,510,455 B1 * | 1/2003 | Chen et al. | 709/206 |
| 6,564,218 B1 | 5/2003 | Roth | |
| 6,757,712 B1 * | 6/2004 | Bastian et al. | 709/206 |
| 6,760,752 B1 * | 7/2004 | Liu et al. | 709/206 |
| 6,907,112 B1 * | 6/2005 | Guedalia et al. | 379/88.17 |
| 6,956,845 B2 * | 10/2005 | Baker et al. | 370/352 |
| 7,039,679 B2 | 5/2006 | Mendez et al. | |
| 2003/0097358 A1 | 5/2003 | Mendez | |
| 2003/0130984 A1 | 7/2003 | Quinlan et al. | |
| 2004/0117310 A1 | 6/2004 | Mendez et al. | |
| 2006/0195595 A1 | 8/2006 | Mendez et al. | |
| 2007/0174433 A1 | 7/2007 | Mendez et al. | |

FOREIGN PATENT DOCUMENTS

| | | |
|---|---|---|
| EP | 0801478 | 10/1997 |
| WO | WO 97/04389 | 2/1997 |
| WO | WO 97/35265 | 9/1997 |
| WO | WO 99/05620 | 2/1999 |
| WO | WO 99/45451 | 9/1999 |

OTHER PUBLICATIONS

Margaret J. Brown, "The Visto Briefcase Pro Puts. Your PIM On The Internet," URL:http://www.zdnet.com/zdnn/stories/zdnn_display/0.3440.341892.00.html, Aug. 13, 1998, 1 page.

Web site entitled "Bookmark Translator 2.0: This Utility transform Microsoft Internet Explore's bookmarks in the format valid for Netscape Navigator and viceversa," Enzo Marianacci, Rome-Jul. 1997, URL=http://www.bns.it/emware/Bookmark Translator-uk.htm, pp. 1-4.

Article by Bellovin et al., entitled: "Network Firewalls" Published by IEEE Communications Magazine Sep. 1994, pp. 50-57.

Article by Steffen Stempel, entitled: "IPAccess-An Internet Service Access System for Firewall Installations" Published by IEEE Communications Magazine Feb. 16, 1995, pp. 31-41.

Article by Braun et al., entitled: "Web Traffic Characterization: an assessment of the impact of caching documents from NCSA's web server" Published by Elsevier Science B.V. 1995 pp. 37-51.

Article by Nelson et al., entitled: "Security for Infinite Networks" Published by IEEE Communications Magazine on Aug. 22, 1995, pp. 11-19.

Article by Greenwald et al., entitled: "Designing an Academic Firewall: Policy, Practice, and Experience with SURF" Published by IEEE Communications Magazine on Feb. 22, 1996, pp. 79-92.

Article by Kiuchi et al., entitled: "C-HTTP—The Development of a Secure, Closed HTTP-based Network on the Internet" Published by IEEE Proceedings of SNDSS on Feb. 22, 1996, pp. 64-75.

Article by S. Cobb, entitled: "Establishing Firewall Policy" Published by National Computer Security Assn. on Jun. 25-27, 1996, pp. 198-205.

U.S. Appl. No. 90/008,397, filed Dec. 29, 2006, Mendez et al.
U.S. Appl. No. 90/008,062, filed Jun. 23, 2006, Mendez et al.
U.S. Appl. No. 90/007,040, filed May 18, 2004, Mendez et al.
U.S. Appl. No. 90/007,093, filed Jun. 18, 2006, Mendez et al.
U.S. Appl. No. 90/007,933, filed Feb. 10, 2006, Mendez et al.
U.S. Appl. No. 90/007,421, filed Feb. 15, 2005, Mendez et al.
U.S. Appl. No. 90/008,162, filed Aug. 11, 2006, Mendez et al.
U.S. Appl. No. 90/008,131, filed Jul. 27, 2006, Mendez et al.
U.S. Appl. No. 90/008,292, filed Oct. 11, 2006, Mendez.
US 5,373,559, 12/1994, Kaufman et al. (withdrawn)

* cited by examiner

SYSTEM AND METHOD FOR AUTOMATICALLY FORWARDING EMAIL AND EMAIL EVENTS VIA A COMPUTER NETWORK TO A SERVER COMPUTER

BACKGROUND OF THE INVENTION

1. Field of the Invention

This invention relates generally to computer networks, and more particularly relates to automatic data forwarding via a computer network to a server computer.

2. Description of the Background Art

Data accessibility and consistency are significant concerns of computer users. For example, when a user maintains multiple computer sites, e.g., a work site and a home site, a user risks having redundant versions of a document or an email. If one of the redundant copies is modified, then the copies become effectively inconsistent. If the user fails to notice any inconsistency, interparty miscommunication or data loss may result. The user must then spend substantial time attempting to reconcile the inconsistent versions and addressing any miscommunications.

Data inconsistency is often caused when the redundant copies of the document or email are maintained on different sites, and when one or more of the redundant copies is inaccessible. For example, if one of versions is maintained on a computer site that is protected by a network security system such as a conventional firewall, e.g., the work computer site, the security system may prevent the user from accessing the copy. Without access to all computer sites, the user is unable to confirm that the version on an accessible site is the most recent draft.

The problems of data inconsistency and inaccessibility arise in the area of electronic mail (email). For example, a user might maintain email databases at a work computer site and at a home computer site. Based on the security systems implemented, a traveling user currently working from a remote terminal may not have access rights to the work computer site or the necessary dedicated application programs to pass the intranet security. Thus, the user may not be able to review the email maintained at the work computer site and thus cannot read or respond to work emails until returning to work. Still further, when maintaining several accessible sites, the traveling user is burdened to maintain a record of all procedures and passwords to overcome the security system of each site.

These problems are further exacerbated when using email programs from different vendors and which implement different protocols. For example, the Netscape Navigator™ e-mail client and the Outlook Express™ email client each manage email across computer networks. However, each email client uses different formats, stores emails in different files and implements different protocols. Thus, the emails are not readily interchangeable.

Therefore, a system and method are needed for providing users with email consistency and accessibility across a computer network.

SUMMARY

A network system includes a server computer system coupled via a computer network to a client computer system, to an email computer system, and to a remote computer system. The server computer system downloads an email forwarding engine to the client computer system for enabling the email forwarding functionality on the client computer system. On the client computer system, the email forwarding engine examines start criteria, determines whether the start criteria have been met, obtains new email and/or email events from an email database, and forwards the new email and/or email events to the server computer system. The server computer system maintains them in a database. The email forwarding engine includes a filter for examining the email and/or email events against filter control data to determine the data to transfer and the desired transfer protocols. The server computer system stores an independently modifiable copy of user preferences, e.g., start criteria, stored on the client computer system to enable remote modification of the user preferences. In accordance with a configuration-check schedule, the client computer system determines whether any changes to the independently modifiable copy of the user preferences has been made, and if so modifies its copy of the user preferences.

A first method embodiment comprises examining start criteria; determining whether the start criteria have been met; obtaining new email events from an email database after the start criteria have been met; and forwarding information corresponding to the new email events via a computer network to a database.

A second method embodiment comprises establishing a communications channel with a client computer system; receiving information corresponding to new email events from the client computer system; and storing the information corresponding to the new email events in a database.

A third method embodiment comprises obtaining filter control data; examining email data against the filter control data; determining at least one transfer protocol for the email data based on the examination; and forwarding the email data according to the at least one transfer protocol via a computer network to a database.

A fourth method embodiment comprises obtaining filter control data; examining email data against the filter control data; determining based on the examination the email data that should not be forwarded; generating receipt data identifying the email data that should not be forwarded; and forwarding the receipt data via a computer network to a database.

A fifth method embodiment comprises storing user preferences on a client computer system; storing an independently modifiable copy of the user preferences on a server computer system coupled via a computer network to the client computer system; examining, by the client computer system, a configuration-check schedule; determining, by the client computer system, whether a configuration check has been scheduled; establishing, by the client computer system if a configuration check has been scheduled, a communications channel with the server computer system; determining whether any changes to the independently modifiable copy of the user preferences stored on the server computer system have been made; and modifying, if any changes have been made to the independently modifiable copy, the user preferences stored on the client computer system according to the changes made.

A sixth method embodiment comprises storing on a server computer system an independently modifiable copy of user preferences stored on a client computer system, the server computer system coupled via a computer network to the client computer system; enabling modification of the independently modifiable copy of the user preferences on the server computer system; establishing a communications channel with the client computer system; and providing any changes made since a last configuration check to the client computer system.

A seventh method embodiment comprises providing website information offering email forwarding functionality to client computer systems; enabling the client computer systems to request the email forwarding functionality to be downloaded; receiving a request for the email forwarding functionality from a requesting client computer system; and downloading an email forwarding engine to the requesting client computer system for enabling the email forwarding functionality on the requesting client computer system.

A first system embodiment comprises a client configuration engine for determining whether start criteria have been met; a retrieval engine, coupled to the client configuration engine, for retrieving email events from an email database; and a data transmitter, coupled to the retrieval engine, for forwarding information corresponding to the new email events via a computer network to a database.

A second system embodiment comprises a server database manager for establishing a communications channel with a client computer system, for receiving information corresponding to new email events from the client computer system, and for storing the information corresponding to the new email events in a database.

A third system embodiment comprises a filter for examining email data against filter control data, and for determining at least one transfer protocol for the email data based on the examination; and a data transmitter, coupled to the filter, for forwarding the email data according to the at least one transfer protocol via a computer network to a database.

A fourth system embodiment comprises a filter for examining email data against filter control data, and determining based on the examination the email data that should not be forwarded; a receipt generator, coupled to the filter, for generating receipt data identifying the email data that should not be forwarded; and a data transmitter, coupled to the filter, for forwarding the receipt data via a computer network to a database.

A fifth system embodiment comprises a client configuration engine for storing user preferences on a client computer system, for storing an independently modifiable copy of the user preferences on a server computer system that is coupled via a computer network to the client computer system, for examining a configuration-check schedule to determine whether a configuration check has been scheduled, for determining whether any changes to the independently modifiable copy have been made, and for modifying the user preferences stored on a client computer system according to the changes made to the independently modifiable copy; and a communications engine, coupled to the client configuration engine, for establishing a communications channel with the server computer system if a configuration check has been scheduled.

A sixth system embodiment comprises a database for storing an independently modifiable copy of user preferences stored on a client computer system, the server computer system coupled via a computer network to the client computer system; a server configuration engine for enabling modification of the independently modifiable copy of the user preferences on the server computer system, for establishing a communications channel with the client computer system, and for providing any changes made since a last configuration check to the client computer system.

A seventh system embodiment comprises website information offering email forwarding functionality to client computer systems; an email forwarding engine, coupled to the website information, for enabling the email forwarding functionality on the client computer systems; and a web server for enabling the client computer systems to request the email forwarding functionality to be downloaded, and for downloading the email forwarding engine to a requesting client computer system.

The system and method advantageously use a trusted third party to maintain email and email events within a network system. Accordingly, a user who maintains for example a work site, a home site and the global server site can forward email and email events to the trusted third party from all three sites. The roaming user can thus access and reply to all emails from all three sites while away. Because the system and method operate over the Internet, emails and email events can be forwarded over any distance. Since the system and method include email format translation, merging emails between different application programs and different platforms is possible. Further, because email and/or email events are forwarded from within a firewall and uses commonly enabled protocols such as HyperText Transfer Protocol (HTTP), the typical firewall which prevents in-bound communications in general and some outbound protocols does not act as an impediment. Since the user preferences are set, the present system and method may operate unattended by the client user. The server computer can maintain a complete record of all emails and email events, so that evidence of the occurrence of non-occurrence of email and events can be maintained. The email system enables the safe transfer of emails and/or email events possibly using encryption or receipt generation. The email system enables emails and/or email events not to be forwarded. The email system enables the filtration and transfer protocols of the emails and/or events to be set by the user based on user preferences such as security level, author, recipients, content, etc.

DETAILED DESCRIPTION OF THE PREFERRED EMBODIMENTS

The following description is provided to enable any person skilled in the art to make and use the invention, and is provided in the context of a particular application and its requirements. Various modifications to the embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1A:
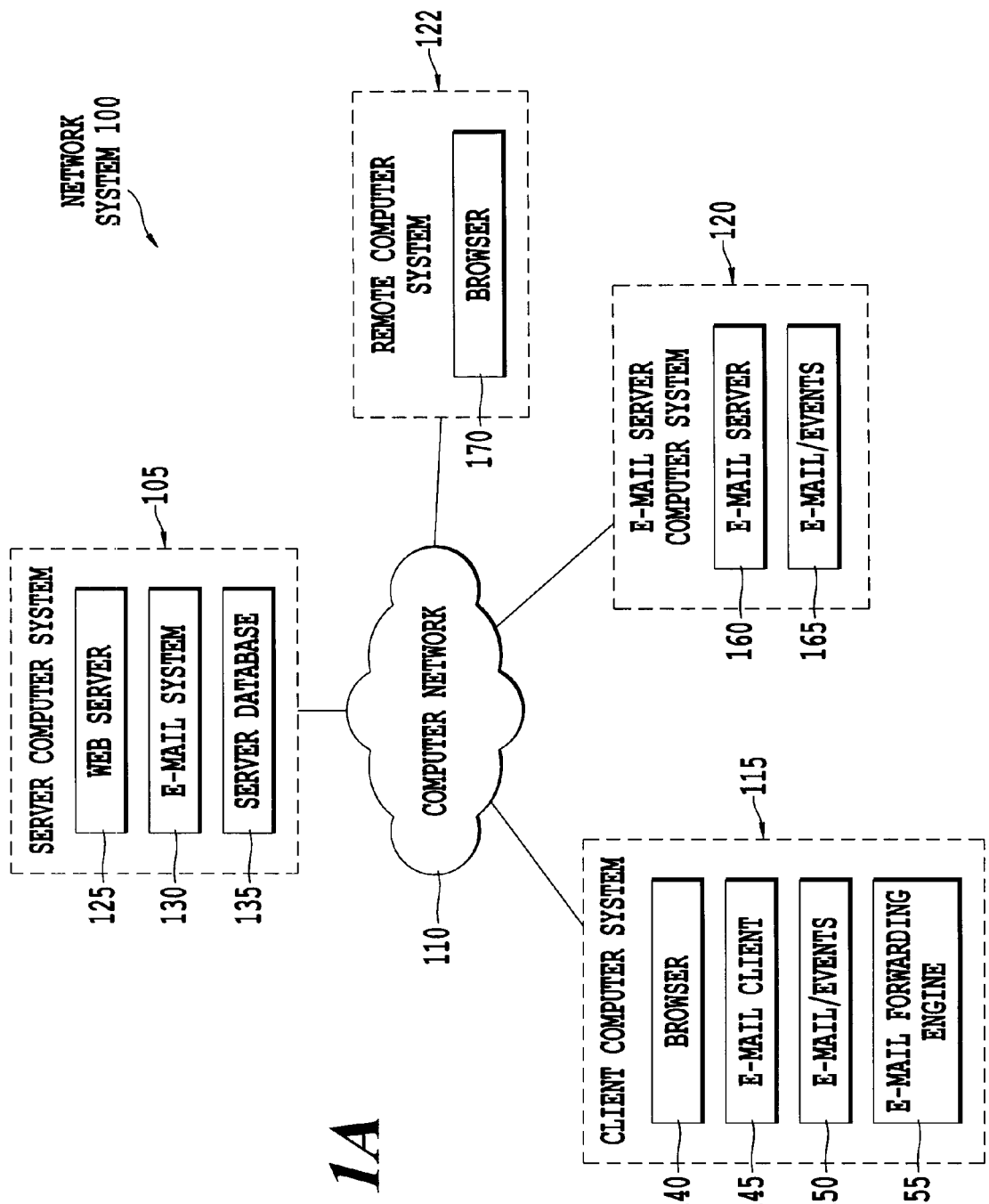
FIG. 1A is a block diagram illustrating a network system, in accordance with an embodiment of the present invention.

FIG. 1A is a block diagram illustrating a network system 100, in accordance with an embodiment of the present invention. The network system 100 includes a server computer system 105 coupled via a computer network 110 to a client computer system 115, to an email server computer system 120, and to a remote computer system 122. It will be appreciated that the computer network 110 may include the wide-area network commonly referred to as "the Internet" and may include one or more local-area networks commonly referred to as "intranets."

The server computer system 105 includes a web server 125, an email system 130 and a server database 135. The web server 125 includes program code, hardware and/or firmware for presenting web pages managed by the server computer system 105, and for responding to browser requests from a client computer system 115. That is, the web server 125 receives data from a browser 140 operating on a client computer system 115, and transmits data to the browser 140 operating on a client computer system 115.

The email system 130 includes program code, hardware and/or firmware for enabling a user on a client computer system 115 to request email forwarding functionality to be added to the client computer system 115, for providing program code to install and enable email and/or email event forwarding on the client computer system 115, and for managing email data (e.g., email and/or email events) forwarded from the client computer system 115. Details of the email system 130 are described in greater detail with reference to FIG. 2.

The server database 135 includes a data structure, which maintains emails and/or email events being forwarded from the client computer system 115. The server database 135 may include multiple data structures for storing multiple sets of emails and/or email events from multiple client computer systems 115. The structure of the server database 135 is maintained by the email system 130.

The client computer system 115 includes a browser 140, an email client 145, email and/or email events (illustrated as "email/events") 150, and, if already installed, an email forwarding engine 155. The browser 140 includes program code, hardware and/or firmware for enabling a client computer system 115 to communicate via the computer network 110 with web servers 125 operated on server computer systems 105, and for presenting information from websites maintained by the web server 125. Examples of browsers 140 include the Netscape Navigator™ browser by the Netscape Communications Corporation and the Internet Explorer™ browser by the Microsoft Corporation.

The email client 145 includes program code, hardware and/or firmware for communicating with an email server 160 maintained on the mail server computer system 120. The email client 145 acts as the interface to conventional email functionality, enabling a user to make conventional requests such as retrieving, writing, reading, forwarding, replying, deleting, etc. Email 150 includes email downloaded from the email server 160, email created and sent from the client computer system 115, etc. Email events 150 includes transaction information such as created email, read email, deleted email, forwarded email, deleted without reading, etc. The email and/or email events 150 preferably does not include an email that has been trashed, e.g., dragged to the trash and the trash emptied, but preferably does include the trashing event.

The email forwarding engine 155 includes program code, hardware and/or firmware for providing the email forwarding functionality to the client computer system 115. The email forwarding engine 155 is preferably downloaded from the server computer system 105, although it may be obtained in several other ways, e.g., uploaded from a CD-ROM or floppy disk, received as an attachment in an email, written, received from any other network site, etc. The email forwarding engine 155 preferably obtains all emails and/or email events 150 and 165 not yet forwarded to the server computer system 105, and forwards them upon satisfaction of predetermined criteria such as the expiration of a time limit or occurrence of a predetermined event. Details of the email forwarding engine 155 are described in FIGS. 3A and 3B.

The email server computer system 120 includes an email server 160 and email and/or email events (illustrated as "email/events") 165. The email server 160 includes program code, hardware and/or firmware for managing email received from the computer network 110, for storing them as email 165, for forwarding the email to the appropriate client computer system 115, and for maintaining a log of email events such as forwarded email from the client computer system to the computer network 110, forwarded email to the client computer system from the computer network 110, etc. Upon request by the email client 145, the email server 160 forwards the email 165 to the email client 145, preferably deletes the email 165 stored thereon, and logs the email events as email and/or email events 165. As stated above, the email client 145 stores the retrieved email 165 as email and/or email events 150. Upon request by the email forwarding engine 155, the email server 160 forward copies of email and/or email events 165 to the email forwarding engine 155 and preferably does not deletes its copies of the email 165.

The remote computer system 122 may be an untrusted computer system being operated by a traveling user. The remote computer system 122 includes a browser 170 for enabling the traveling user to access and retrieve emails and email events from the server database 135 managed by the email system 130 on the server computer system 105.

It will be appreciated that the server computer system 105, the client computer system 115, the email server computer system 120 and the remote computer system 122 may each be a single computer or multiple computers networked together. Further, it will be appreciated that portions of the program code, hardware and/or firmware on each computer system may be maintained on different computers. Still further, it will be appreciated that the server database 135, the email and/or email events 150 and the email and/or email events 165 need not be stored on the same computer as the program code, hardware and/or firmware that is managing or manipulating it.

Figure 1B:
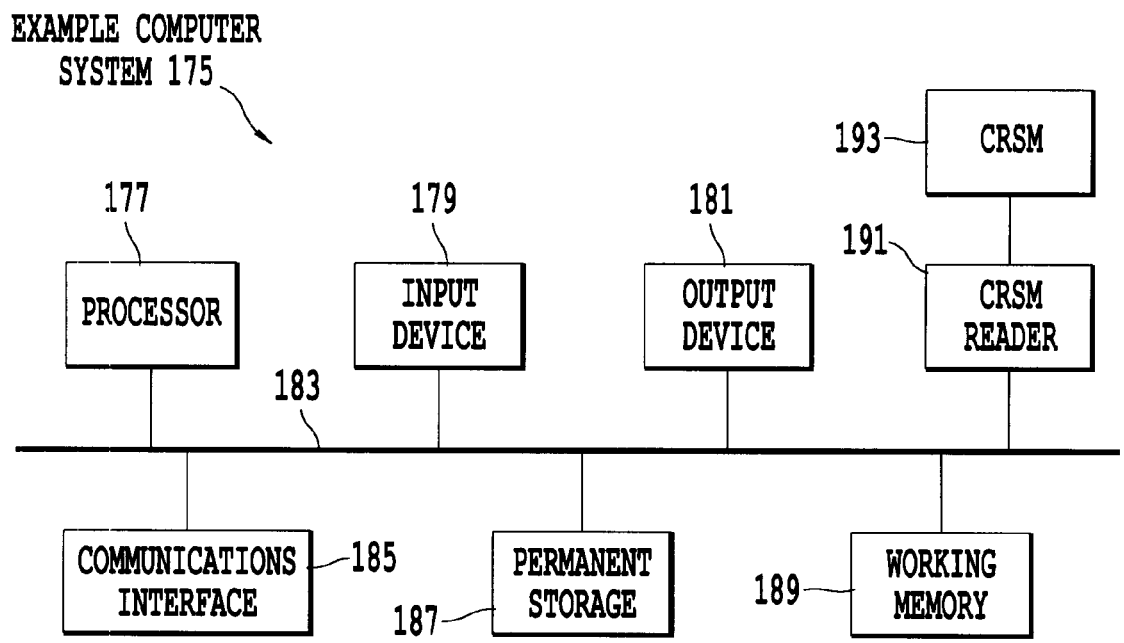
FIG. 1B is a block diagram illustrating details of an example computer system of FIG. 1.

FIG. 1B is a block diagram illustrating details of a computer system 175, wherein each of the server computer system 105, the client computer system 115, the email server computer system 120 and the remote computer system 122 is a specific example thereof. The computer system 175 includes a processor 177, such as an Intel Pentium® microprocessor or a Motorola Power PC® microprocessor, coupled to a communications channel 183. The computer system 175 further includes an input device 179 such as a keyboard or mouse, an output device 181 such as a cathode ray tube display, a communications interface 185, permanent storage 187 such as a magnetic disk, and working memory 189 such as Random-Access Memory (RAM), each coupled to the communications channel 183. The communications interface 185 may be coupled to the computer network 110. One skilled in the art will recognize that, although the permanent storage 187 and working memory 189 are illustrated as different units, the permanent storage 187 and working memory 189 can be parts of the same unit or units on different computer systems.

One skilled in the art will recognize that the computer system 175 may also include additional information, such as network connections, additional memory, additional processors, LANs, input/output lines for transferring information across a hardware channel, the Internet or an intranet, etc.

One skilled in the art will also recognize that the program code and data may be received by and stored in the computer system 175 in alternative ways. For example, a computer-readable storage medium (CRSM) reader 191 such as a magnetic disk drive, hard disk drive, magneto-optical reader, CPU, etc. may be coupled to the communications channel 183 for reading a computer-readable storage medium (CRSM) 193 such as a magnetic disk, a hard disk, a magneto-optical disk, RAM, etc. Accordingly, the system 175 may receive program code and data via the CRSM reader 191. Further, it will be appreciated that the term "memory" herein is intended to cover all data storage media whether permanent or temporary.

Figure 2:
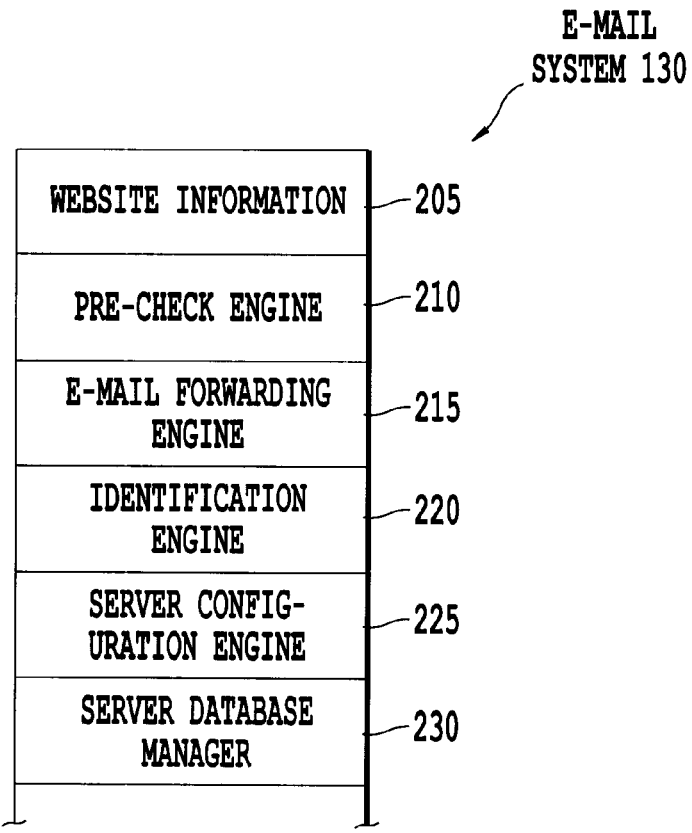
FIG. 2 is a block diagram illustrating details of the email system of FIG. 1.

FIG. 2 is a block diagram illustrating details of the email system 130. The email system 130 includes website information 205, a pre-check engine 210, an email forwarding engine 215, an identification engine 220, a server configuration engine 225, and a server database manager 230.

The website information 205 includes program code (e.g., applets, scripts, HTML, etc.) and/or data that the web server 125 provides to browsers 140 accessing the appropriate webpage. The website information 205 may include descriptions of the email forwarding functionality and the multiple versions available. The website information 205 may also include the buttons and button functionality for requesting the email forwarding functionality to be downloaded to the requesting client computer system 115.

The pre-check engine 210 includes program code such as ActiveX™ controls, applets, HTML, script, etc., which when provided to the browser 140 is automatically executed. The pre-check engine 210 determines whether the client computer system 115 has a satisfactory version of the email forwarding engine 215 already installed. For example, the pre-check engine 210 may be configured to examine whether the email forwarding engine 215 already installed thereon includes all the necessary modules to conduct satisfactory email and/or email event forwarding. If the email forwarding engine 215 is too antiquated or non-existent, the pre-check engine 210 will instruct the web server 125 to download the latest version of the email forwarding engine 215. Otherwise, the pre-check engine 210 will instruct the web server 125 to present website information 205 informing the user that the version installed thereon is still satisfactory.

The email forwarding engine 215 includes program code, hardware and/or firmware for providing the email functionality described above with reference to FIG. 1A. That is, the email forwarding engine 215 self-installs, determines whether certain start criteria have been met, and, if so, retrieves newly received or created emails and/or email events. The email forwarding engine 215 determines the sensitivity of the email or email event, and forwards the emails, email events or a message (e.g., receipt confirmation) corresponding to the emails and/or email events to the server computer system 105 for storage. Details of the email forwarding engine 215 are provided in and with reference to FIGS. 3A and 3B.

The identification engine 220 includes program code, hardware and/or firmware for communicating with the email forwarding engine 155 on the client computer system 115 to provide it with an ID and password for communicating with the server computer system 105. The identification engine 220 may alternatively provide any identification and authentication technique such as certificates, public and private key cryptography, single-key two-way encryption, etc.

The server configuration engine 225 includes program code, hardware and/or firmware for obtaining client configuration information including the processor type and speed, the communication protocols, etc. and for obtaining user preferences including preferred start criteria and filter data. The server configuration engine 225 also provides remote control of user preferences. For example, a user can access the server configuration engine 225 from the remote computer system 122, and request different start criteria for the email forwarding engine on the client computer system 115. The email forwarding engine 155 includes program code, hardware and/or firmware that contacts the server computer system 105 to check if user preferences have changed. If so, the email forwarding engine 155 will change its preferences, e.g., the start criteria. The user preferences may also include the configuration-check schedule. Remote control of user preferences by the server configuration engine 225 is described in greater detail in and with reference to FIGS. 3A and 3B.

The server database manager 230 includes program code, hardware and/or firmware for receiving emails and/or email events 150 and 165 from the client computer system 115, and for storing them in the server database 135. The server database manager 230 preferably maintains the emails and email events in separate sub-folders, and both in a folder corresponding to the user. If requested, the server database manager 230 may divide the emails or email events into sub-sub-folders corresponding to user defined preferences. For example, the user may opt to have emails further divided into sub-sub-folders corresponding to the sites from which they were forwarded, corresponding to the sender, corresponding to their sensitivity, etc.

Figure 3A:
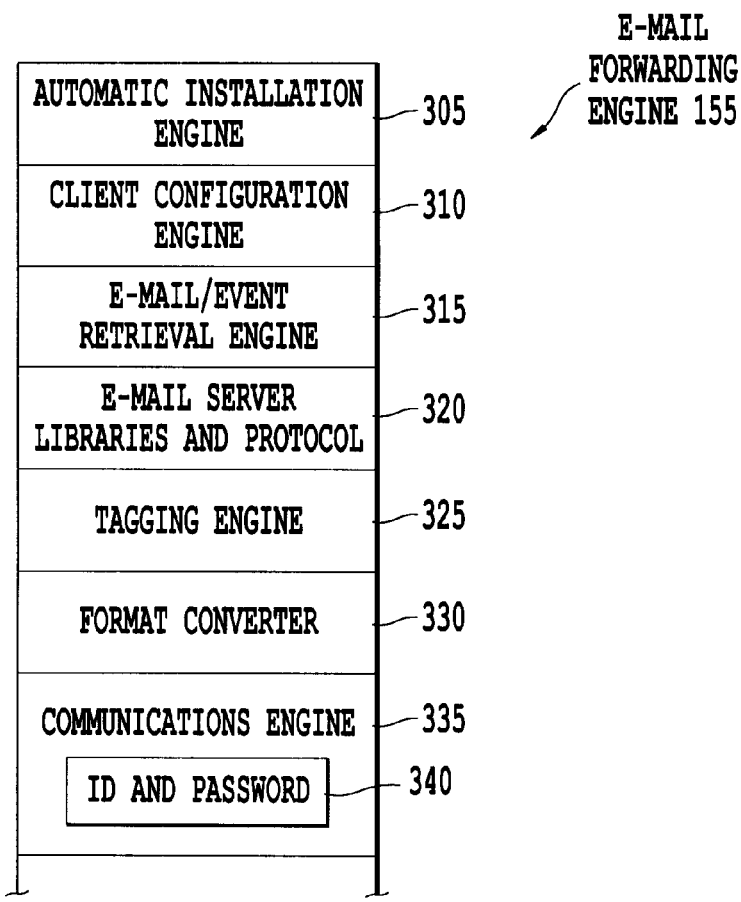
FIGS. 3A and 3B are a block diagram illustrating details of the email forwarding engine of FIG. 1.
Figure 3B:
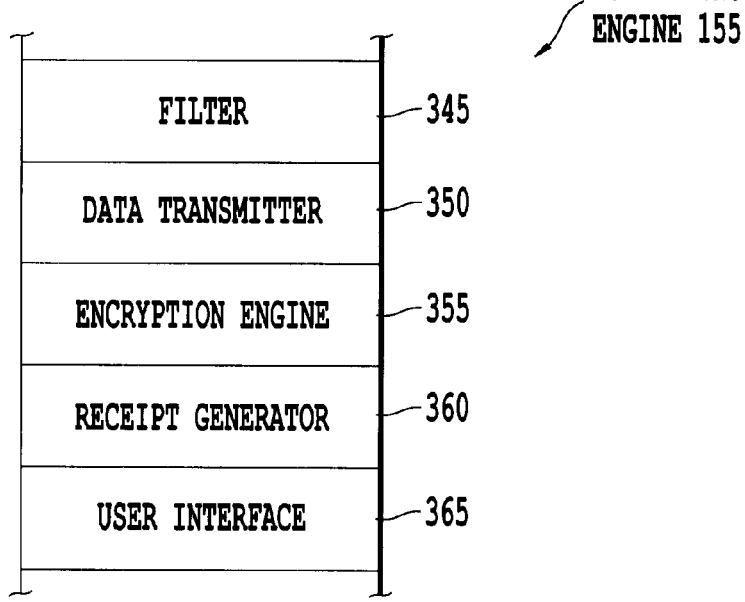

FIGS. 3A and 3B are a block diagram illustrating details of the email forwarding engine 155 on the client computer system 115. The email forwarding engine 155 includes an automatic installation engine 305, a client configuration engine 310, an email and/or email event retrieval engine 315 (illustrated as "email/event retrieval engine"), email server libraries and protocol 320, a tagging engine 325, a format converter 330, a communications engine 335, a filter 345, a data transmitter 350, an encryption engine 355, a receipt generator 360 and a user interface 365.

The automatic installation engine 305 includes program code, hardware and/or firmware for automatically installing the remaining components of the email forwarding engine 155 to provide the email forwarding functionality described above with reference to FIGS. 1A and 2. The automatic installation engine 305 preferably uses conventional installation protocols. The automatic installation engine 305 preferably causes the email forwarding engine 155 to initiate each time the client computer system is booted up, either by placing it as a start-up file or making arrangements with the scheduler on the client computer system 115.

The client configuration engine 310 includes program code, hardware and/or firmware for obtaining system configuration information such as processor type and speed, RAM available, etc. and for enabling the user to select preferences. Selecting preferences may include selecting start criteria, such as every fifteen minutes, every day at a particular time, after a predetermined event, e.g., receipt of an email or an expected email, etc. The user preferences may be initially set to defaults. The client configuration engine 310 uses the communications engine 335, described below, to establish a communications channel with the server computer system 105, and forwards the configuration information and user selected preferences to the server configuration engine 225 of the email system 130, which stores the information.

After the start criteria have been met, the client configuration engine 310 contacts the server configuration engine 225 to determine whether the user selected preferences have been modified remotely. Alternatively, the client configuration engine 310 may check whether the start criteria have been modified remotely, in accordance with a schedule independent from the start criteria, i.e., in accordance with a configuration-check schedule. Accordingly, if the user selected preferences, e.g., the start criteria, have been modified, the client configuration engine 310 modifies the user selected preferences, and determines whether the new start criteria have been met. If so, the client configuration engine 310 initiates the email and/or email event retrieval engine 315. Otherwise, the client configuration engine 310 returns to waiting. Similarly, if other user preferences, e.g., filter control data described below, the client configuration engine 310 modifies those user preferences. In another embodiment, the filter control data may not be remotely modifiable. It will be further appreciated that the configuration-check schedule may also be configured to be modified remotely.

The email and/or email event retrieval engine 315 includes program code, hardware and/or firmware for retrieving new email (received from the computer network 110) and email events (such as received email, forwarded email to client computer system 115, forwarded email to the computer network 110, etc.) 165 from the email server computer system 120. The retrieval engine 315 also includes program code, hardware and/or firmware for retrieving new email (created at the client computer system 115 or received from the email server computer system 120) and email events (such as created email, forwarded email, replied to email, trashed email, etc.) 150. It will be appreciated that the retrieval engine 315 may communicate with the email client 145 to retrieve email and/or email events 150, and to act as a proxy to the email server 160 to retrieve email and/or email events 165 from the email server computer system 120. Alternatively, the retrieval engine 315 may obtain the information directly from their storage locations.

The retrieval engine 315 uses the email server libraries and protocol 320 either to communicate directly with the email server 160, to retrieve the email 165 directly, to communicate with the email client 145, or to retrieve the email 165 and/or email events 150 directly. For example, the email server libraries and protocol 320 include the libraries and protocol for communicating with a variety of different email server formats such as MAPI and the POP3.

The tagging engine 325 includes program code, hardware and/or firmware for identifying the emails and/or email events 150 and 165 that are being forwarded to the server computer system 105. The tagging engine 325 preferably maintains the date and time of the last email and/or email event 150 and 165 at least to the second, and possible to the millisecond. The retrieval engine can compare all emails and/or email events 150 and 165 against this date and time to determine which are new and which have already been forwarded.

The format converter 330 includes program code, hardware and/or firmware for converting emails and/or email events 150 and 165 to a common format, e.g., MIME. Not all email server computer systems 120 operate using the same format. Accordingly, a format converter 330 may be used to forward format converted emails and/or email events 150 and 165 to the server computer system 105 in a single format.

The communications engine 335 includes program code, hardware and/or firmware for establishing a communications channel with the email system 130. The communications engine 335 includes an ID and password 340 which identifies and authenticates the email forwarding engine 155, and thus the user. The communications engine 335 may use secure connection techniques such as SSL, encryption, private and public key cryptography, etc. The communications engine 335 enables the other components of the email forwarding engine 155 to communicate with the components the email system 130.

The filter 345 includes program code, hardware and/or firmware for examining the email and/or email events 150 and 165 that are scheduled to be forwarded to the server computer system 105 against the user preferences (e.g., filter control data), and for determining what data will actually be forwarded. For example, if an email contains sensitive information, a user may prefer not to have it forwarded, to have it forwarded using secure means or to have only a portion forwarded. Similarly, the user may prefer only to have emails from select individuals forwarded. Thus, in accordance with the filter control data, the filter 345 may examine the recipient list, the sender list, the email content, or the like in accordance with the filter control data to control what gets forwarded and how. For example, a user may specify in the filter control data that, if an email contains the word "confidential," "privileged," "sensitive," etc., then only a confirmation of receipt (not the email) should be forwarded. The user may also specify that, if the email is from "John Smith," then the email should be sent using encryption. The user may also specify that, if the email has been sent to at least one recipient having an email address in a public site such as "yahoo" or "hotmail," then the email can be sent without encryption regardless. The filter 345 operates on email and email events similarly.

The data transmitter 350 includes program code, hardware and/or firmware for transmitting the data that the filter 345 allowed or generated. The transmitter 350 may use conventional message packets transfer techniques, handshaking protocols, etc. to transfer the data.

The encryption engine 355 includes program code, hardware and/or firmware for encrypting messages being transmitted to the server computer system 105. The encryption engine 355 may operate with the communications engine 335 when encrypting all messages. The encryption engine 355 may operate with the data transmitter 350 when encrypting all messages, or when transmitting only messages specified by the filter 345 to be encrypted. The encryption engine 355 preferably uses conventional techniques such as public and private key cryptography or two-way single-key encryption.

The receipt generator 360 includes program code, hardware and/or firmware for operating with the filter 345 to generate a confirmation of receipt of an email and/or email event 150 or 165 to be forwarded in lieu of the actual email and/or email event 150 or 165.

The user interface 365 includes program code, hardware and/or firmware to enable the user to set user preferences and other information.

Figure 4A:
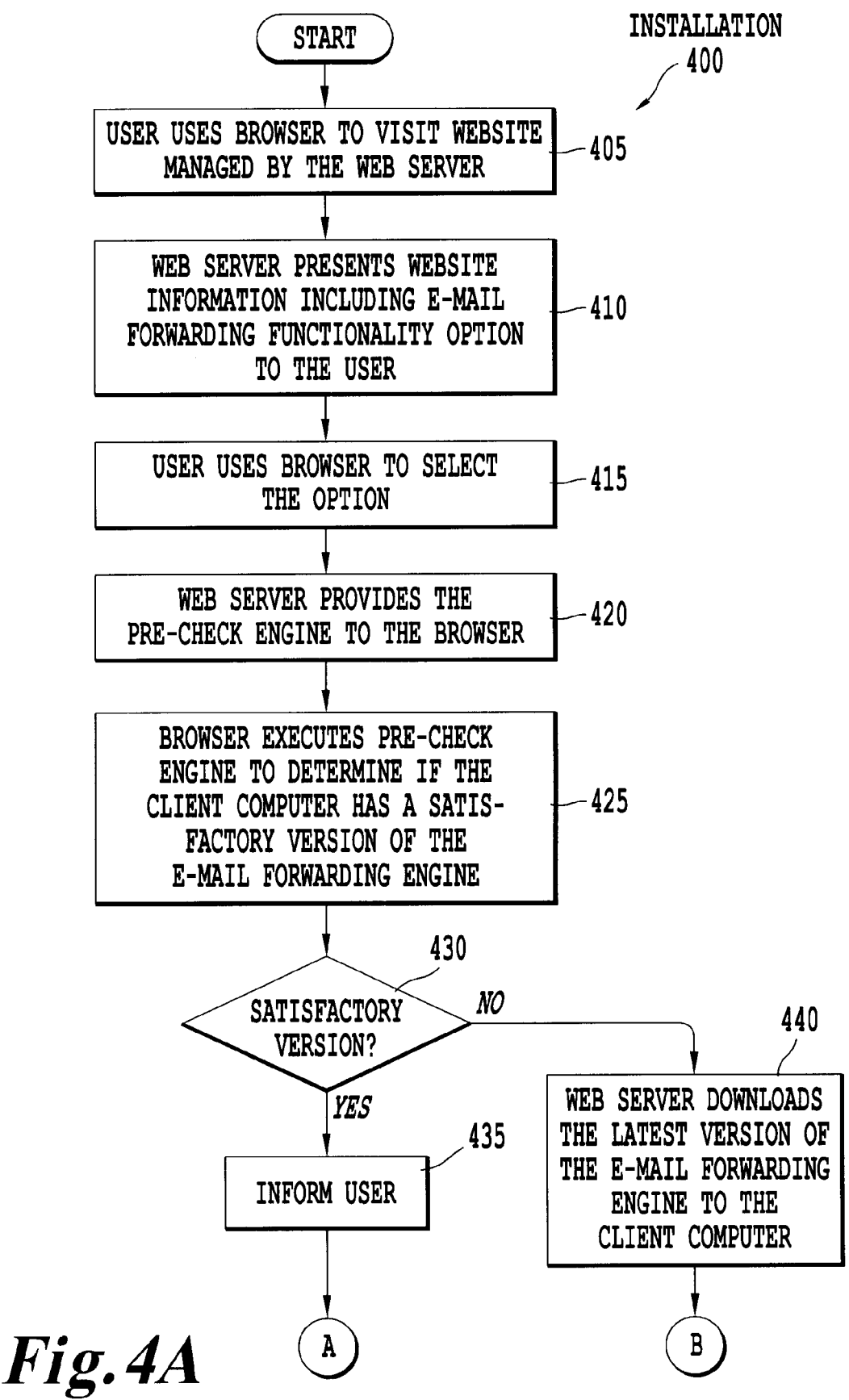
FIGS. 4A-4C are a flowchart illustrating a method of installing the email forwarding engine on a client computer system, in accordance with an embodiment of the present invention.
Figure 4B:
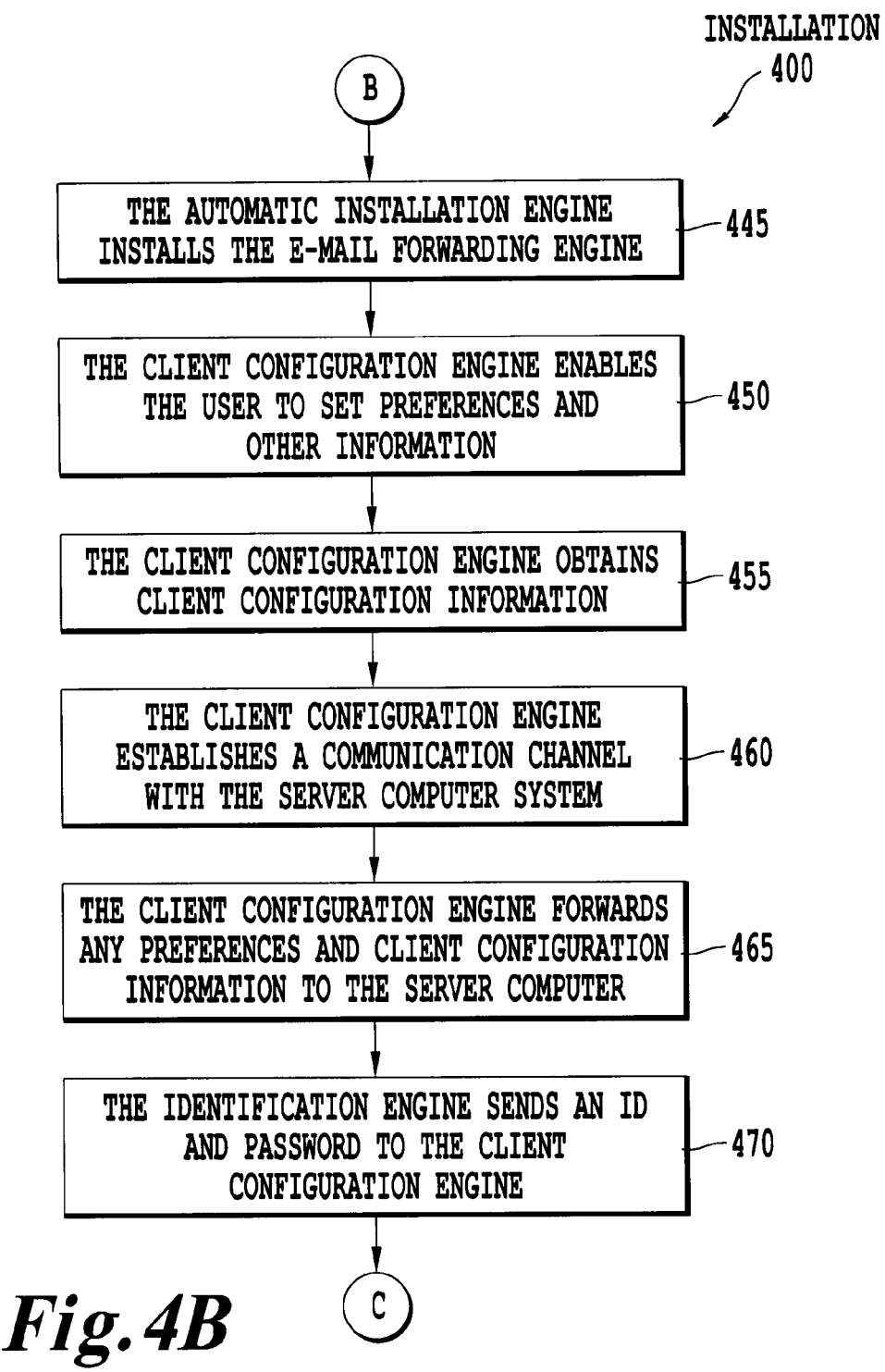
Figure 4C:
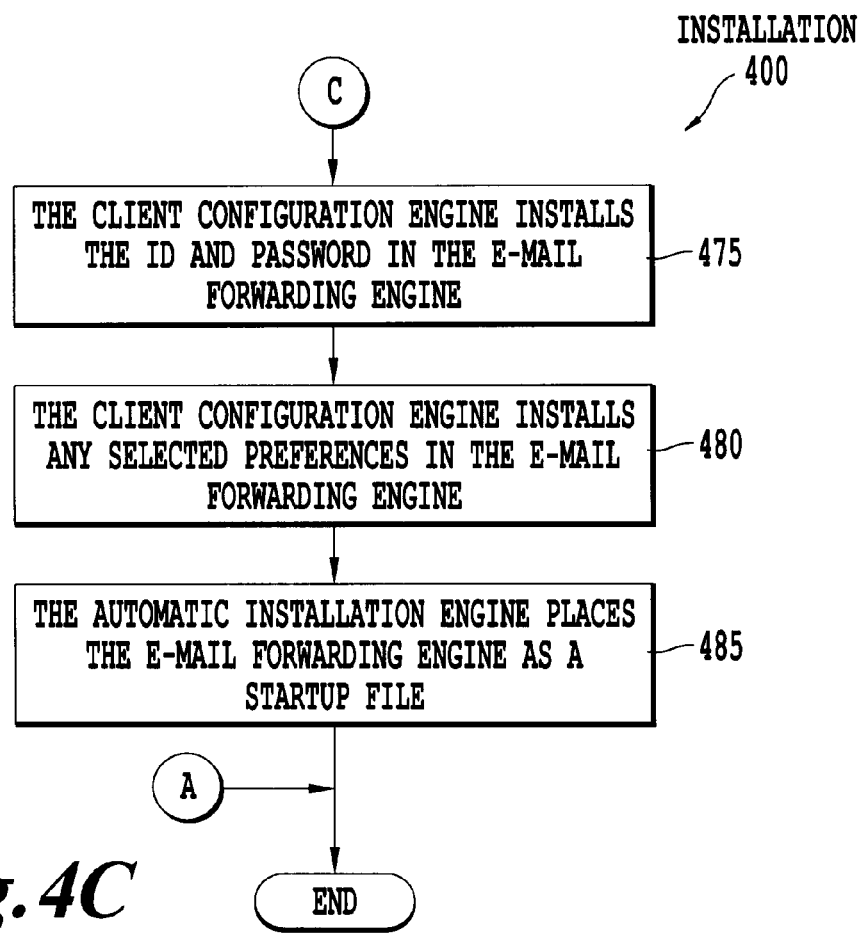

FIGS. 4A-4C are a flowchart illustrating a method 400 of automatically installing the email forwarding functionality, in accordance with an embodiment of the present invention. The method 400 begins with the browser 140 in step 405 receiving a request from a user to access a particular website managed by the server computer system 105. The web server 125 in step 410 presents website information 205 including the email forwarding functionality option to the user. In response to a user request, the browser 140 in step 415 selects the option.

The web server 125 in step 420 provides the pre-check engine 210 to the browser 140. The browser 140 in step 425 executes (or interprets) the pre-check engine 210 to determine whether the client computer system 110 already has a satisfactory version of the email forwarding engine 155 installed thereon. If so, then the pre-check engine 210 in step 435 informs the user, and method 400 then ends. Otherwise, the web server 125 in step 440 downloads the latest version of the email forwarding engine 155 to the client computer system 115.

In step 445, the browser 140 initiates execution of the automatic installation engine 305, which installs the remaining components of the email forwarding engine 155 on the client computer system 115. The client configuration engine 310 in step 450 enables the user to select or set preferences (e.g., start criteria, filter control data, configuration-check schedule and other information), in step 455 obtains any client configuration information (e.g., processor type and speed, connection type and speed, etc.) and in step 460 establishes a communications channel with the server computer system 105. The client configuration engine 310 in step 465 forwards any user preferences and client configuration information to the server computer system 105.

The identification engine 220 in step 470 sends an ID and password (or other identification and authentication information) to the client configuration engine 310, which in step 475 installs the ID and password in the communications engine 335 of the email forwarding engine 155. The automatic installation engine 305 in step 485 places the email forwarding engine 155 as a start-up file, makes arrangement with the scheduler to start the email forwarding engine 155 upon boot up, or any other equivalent technique. Method 400 then ends.

Figure 5B:
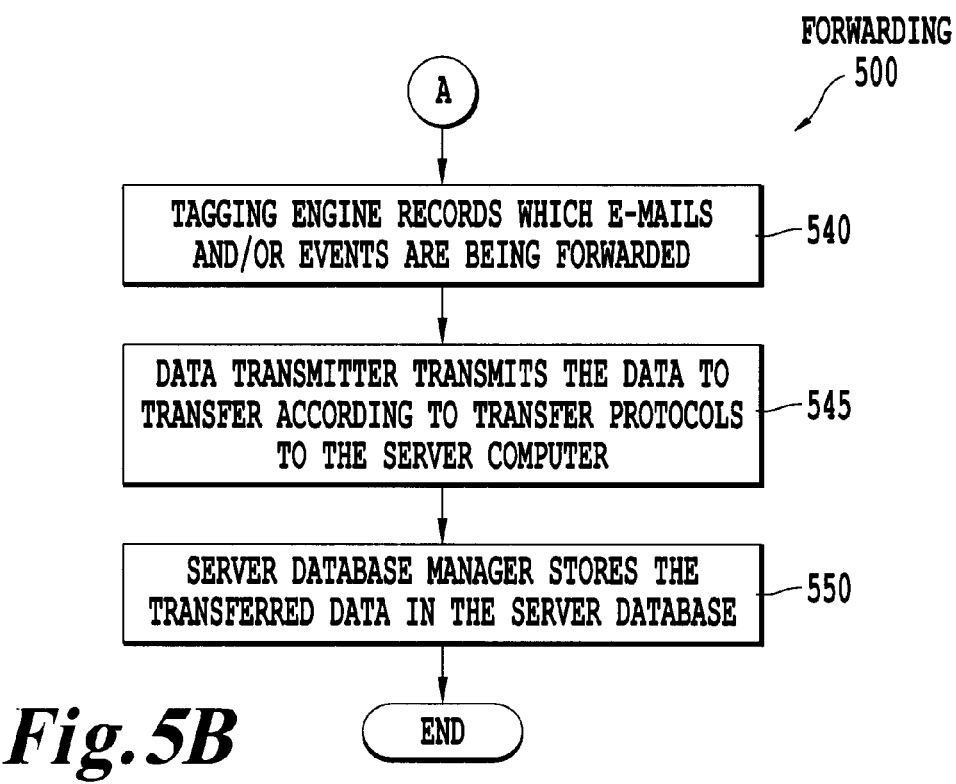
FIGS. 5A and 5B are a flowchart illustrating a method of forwarding emails from a client computer system across a computer network to a server computer system, in accordance with an embodiment of the present invention.
Figure 5A:
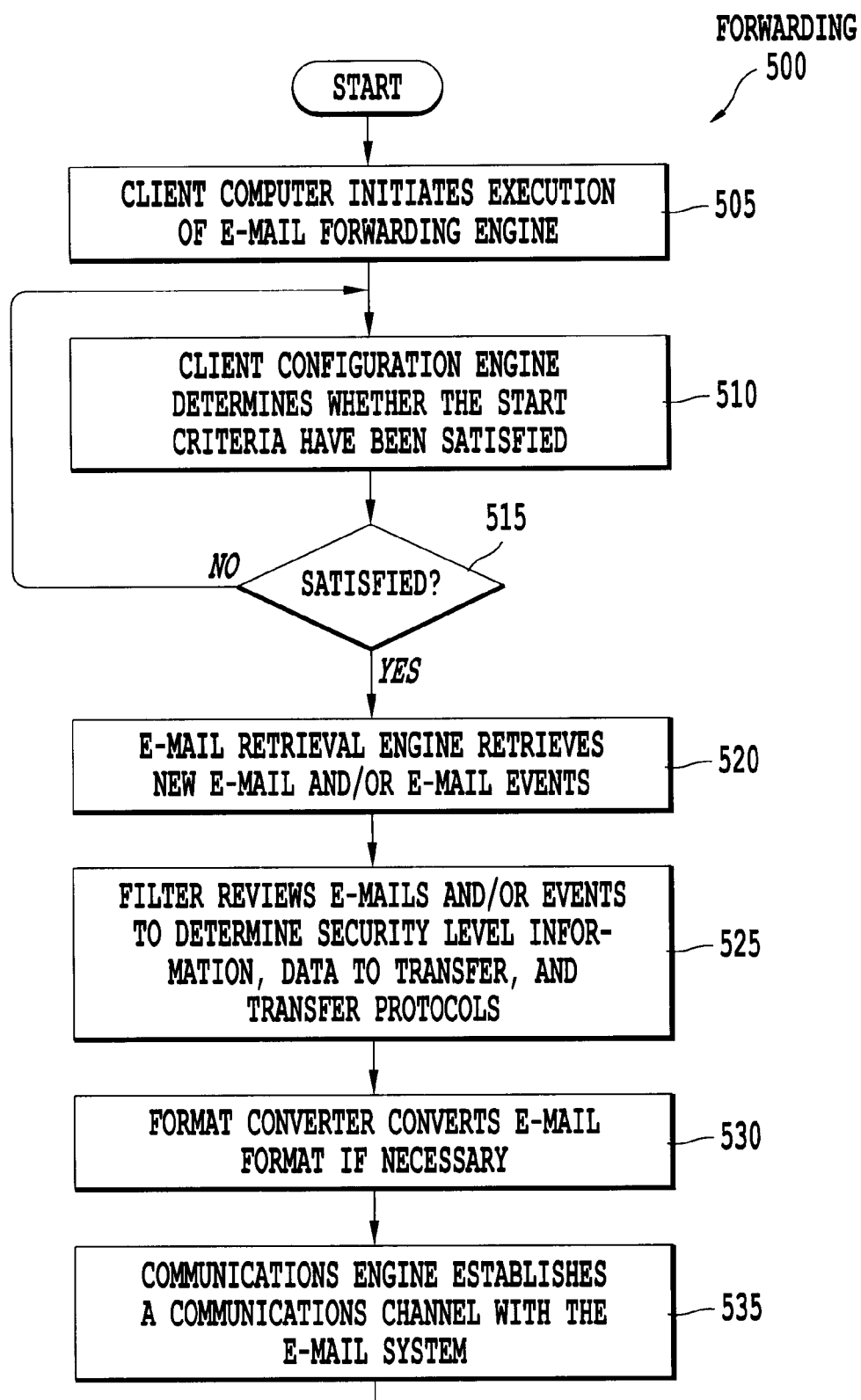

FIGS. 5A and 5B are a flowchart illustrating a method 500 of forwarding email and/or email events, in accordance with an embodiment of the present invention. Method 500 begins with the client computer system 115 in step 505 initiating execution or interpretation of the email forwarding engine 155. The client configuration engine 310 in steps 510 and 515 determines whether predetermined start criteria have been met. If the criteria have not been met, then the client configuration engine 310 returns to step 510.

If the criteria have been met, then the email and or email retrieval engine 315 in step 520 retrieves new email and/or email events 150 and 165 from the client computer system 115 and from the email server computer system 120. The filter 345 in the step 525 reviews the emails and/or email events 150 and 165 retrieved against filter control data to determine the "security" level of the information, the data to transmit and the transfer protocols. For example, the user may have specified that, if an email message retrieved includes the word "privileged," then the email should be encrypted and then forwarded. As another example, the user may have specified that, if the email and/or email event was with "John Smith," then nothing about the transaction should be forwarded. As yet another example, the user may have specified that, if an email transaction remained only within the local network of the workplace, only a receipt identifying the transaction should be forwarded. Based on the filter control data, the filter 345 determines what data to transmit and how to transmit it.

The format converter 330 in step 530 converts, if necessary, any email and/or email events to the proper email format. For example, if an email is in the RTF format, but all email on server computer system 105 is maintained in MIME format, the format converter 330 converts the email from the RTF format to the MIME format.

The communications engine 335 in step 535 uses the ID and password 340 to establish a communications channel with the email system 130. The tagging engine 325 in step 540 records which emails and/or events are being forwarded, preferably, by maintaining the date and time of the last email and/or event being forwarded to the nearest millisecond. The data transmitter 350 in step 545 transmits the data to transfer, as determined by the filter 345, according to the transfer protocols, also as determined by the filter 345, to the email system 130. The data transmitter 350 uses encryption engine 355 to encrypt messages labeled for encryption and the receipt generator 360 to generate receipts, as needed. The server database manager 230 in step 550 stores the transferred data in the server database 135. Method 500 then ends.

Figure 6:
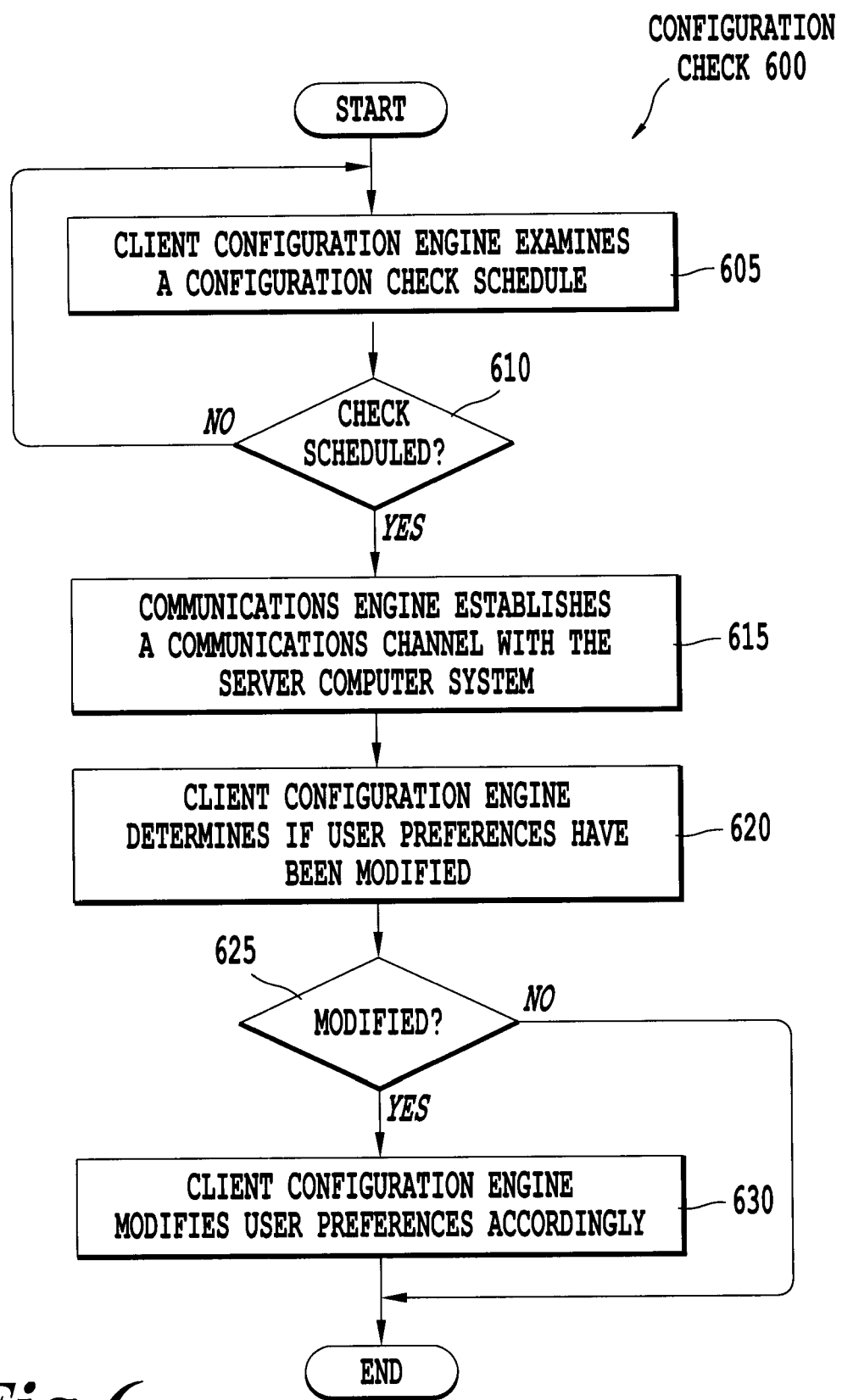
FIG. 6 is a flowchart illustrating a method of checking whether there has been remote modification of the user preferences, in accordance with an embodiment of the present invention.

FIG. 6 is a flowchart illustrating a method 500 of checking whether there has been a remote modification of user preferences. Method 500 begins with the client configuration engine 310 in step 605 examining a configuration-check schedule. The configuration-check schedule may be a default schedule that defines the times when the client configuration engine 310 should check for remote changes to the user preferences. Alternatively, the configuration-check schedule may be user defined in the user preferences. In step 610, the client configuration engine 310 determines whether a check has been scheduled. If not, then the method 600 returns to step 605.

If a check has been scheduled, then the communications engine 335 in step 615 uses the ID and password 340 to establish a communications channel with the server configuration engine 225 on the server computer system 105. The client configuration engine 310 in steps 620 and 625 communicates with the server configuration engine 225 to determine if any remote changes to the user preferences have been made. These changes may include changes to the start criteria and changes to the configuration-check schedule. If not, then method 600 ends. Otherwise, the client configuration engine 310 in step 630 modifies the user preferences on the client computer system 115. Method 600 then ends.

The foregoing description of the preferred embodiments of the present invention is by way of example only, and other variations and modifications of the above-described embodiments and methods are possible in light of the foregoing teaching. For example, although the server computer, client computer and email server computer are each illustrated as a single device, each may include several computers networked together. Although the network sites are being described as separate and distinct sites, one skilled in the art will recognize that these sites may be a part of an integral site, may each include portions of multiple sites, or may include combinations of single and multiple sites. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method of forwarding email, comprising:
    downloading an email forwarding engine from a server computer to a client personal computer, the downloaded email forwarding engine including computer-readable instructions to cause the client personal computer to
    examine start criteria, the start criteria being independent of email stored in an email datastore of an email server;
    determine whether the start criteria are met;
    obtain new email events from the email datastore when the start criteria are met, the new email events including transactional information indicating a status of the email stored in the email datastore of the email server;
    forward information including the new email events via a computer network to a datastore associated with the server;
    compare the start criteria stored on the client personal computer with start criteria stored on the server; and synchronize the start criteria stored on the client personal computer and the start criteria stored on the server when a difference is detected therebetween, wherein the transactional information includes information indicating the email as at least one of created email, forwarded email, replied to email and deleted email.

2. The method of claim 1, wherein the client personal computer is protected by a firewall.

3. The method of claim 1, wherein the downloaded email forwarding engine self-installs.

4. The method of claim 1, wherein the email events include emails.

5. A system for forwarding email, comprising:
a server computer storing a client software for downloading to a client personal computer, the client software including
a client configuration engine configured to determine whether start criteria are met, the start criteria being independent of email stored on an email datastore of an email server, the client configuration engine also being configured to compare the start criteria stored on the client personal computer with start criteria stored on the server and to synchronize the start criteria stored on the client personal computer with the start criteria stored on the server when a difference is detected therebetween;
a retrieval engine, coupled to the client configuration engine, configured to receive new email events from the email datastore, the new email events including transactional information indicating a status of the email stored on the email datastore of the email server; and
a data transmitter, coupled to the retrieval engine, configured to forward information including the new email events via a computer network to a datastore associated with the server,
wherein the transactional information includes information indicating the email as at least one of created email, forwarded email, replied to email and deleted email.

6. The system of claim 5, wherein the client personal computer is protected by a firewall.

7. The system of claim 5, wherein the downloaded client software self-installs.

8. The system of claim 5, wherein the email events include emails.

9. A method of forwarding email, comprising:
establishing a communications channel between a server and a client personal computer system;
downloading, to the client computer system, an email forwarding engine;
receiving, at the client computer system, information including new email events from an email datastore of an email server, the email events including transactional information indicating a status of emails stored on the email datastore of the email server;
storing the information including the new email events in a datastore associated with the server;
forwarding the information stored in the datastore associated with the server to an appropriate client personal computer; and
comparing start criteria stored on the server with start criteria stored on the client personal computer, the start criteria stored on the server and the start criteria stored on the client personal computer being independent of the information stored in the datastore,
wherein the start criteria of the client personal computer is synchronized to the start criteria of the server when a difference is detected therebetween, and the transactional information includes information indicating the email as at least one of created email, forwarded email, replied to email and deleted email.

10. The method of claim 9, wherein the client personal computer is protected by a firewall.

11. The method of claim 9, wherein the email events include emails.

12. A system for forwarding email, comprising:
a server computer including a datastore and a client software for downloading to a client personal computer, the client software including
a retrieval engine to retrieve new email events from an email datastore of an email server, the email events including transactional information indicating a status of emails stored on the email datastore of the email server, and
a client configuration engine configured to determine whether start criteria are met, the start criteria being independent of the emails stored on an email datastore, the client configuration engine also being configured to compare the start criteria stored on the client personal computer with start criteria stored on the server and to synchronize the start criteria stored on the client personal computer with the start criteria stored on the server when a difference is detected therebetween;
the server being configured to establish communications with the client computer system, receive information including new email events from the client computer system, store the information including the new email events in the datastore of the server, and convey the information stored in the datastore of the server to an appropriate client personal computer,
wherein the transactional information includes information indicating the email as at least one of created email, forwarded email, replied to email and deleted email.

13. The system of claim 12, wherein the client personal computer is protected by a firewall.

14. The system of claim 12, wherein the email events include emails.

15. A method of forwarding email, comprising:
downloading an email forwarding engine from a server computer system to a client personal computer, the downloaded email forwarding engine including computer-readable instructions to cause the client personal computer to
obtain filter control data, the filter control data being independent of email data, the email data including transactional information indicating a status of the email data;
examine the email data against the filter control data;
determine the email data that will be forwarded based on the examination;
select at least one transfer protocol for the email data based on the examination;
forward the email data according to the at least one transfer protocol via a computer network to a datastore associated with the server;
compare the filter control data stored on the client personal computer with filter control data stored on the server at predetermined time intervals; and
synchronize the filter control data stored on the client personal computer to the filter control data stored on the server when a difference is detected between therebetween,
wherein the transactional information includes information indicating the email as at least one of created email, forwarded email, replied to email and deleted email.

16. The method of claim 15, wherein the client personal computer is protected by a firewall.

17. The method of claim 15, wherein the downloaded email forwarding engine self-installs.

18. A system for forwarding email, comprising:
a server computer including a client software for downloading to a client personal computer, the client software including
a filter configured to examine email data against filter control data to select email data based on the examination, and configured to determine at least one transfer protocol for the email data based on the examination, the email data including transactional information indicating a status of the email data;
a data transmitter, coupled to the filter, configured to forward the email data according to the at least one transfer protocol via a computer network to a datastore associated with the server and server software that forwards the forwarded email data to a remote device;
a client configuration engine configured to compare the filter control data stored on the client personal computer with a filter control data stored on the server and configured to synchronize the filter control data stored on the client personal computer to the filter control data stored on the server when a difference is detected therebetween,
wherein the filter control data stored on the client personal computer and the filter control data stored on the server are independent of the email data, and the transactional information includes information indicating the email as at least one of created email, forwarded email, replied to email and deleted email.

19. The system of claim 18, wherein the client personal computer is protected by a firewall.

20. The system of claim 18, wherein the downloaded client software self-installs.

21. A method of forwarding email, comprising:
downloading a computer program from a server computer system to a client personal computer, the downloaded computer program including computer-readable instructions to cause the client personal computer to
obtain filter control data, the filter control data being independent of email data, the email data including transactional information indicating a status of the email data;
examine the email data against the filter control data;
determine, based on the examination, the email data that should not be forwarded;
generate receipt data identifying the email data that should not be forwarded;
forward the receipt data via a computer network to a datastore associated with the server;
compare the filter control data stored on the client personal computer with filter control data stored on the server; and
synchronize the filter control data stored on the client personal computer to the filter control data stored on the server when a difference is detected therebetween,
wherein the transactional information includes information indicating the email as at least one of created email, forwarded email, replied to email and deleted email.

22. The method of claim 21, wherein the client personal computer is protected by a firewall.

23. A system for forwarding email, comprising:
a server computer including a client software for downloading to a client personal computer, the client software including
a filter configured to examine email data against filter control data, the filter control data being independent of the email data, and configured to determine, based on the examination, the email data that will not be forwarded, the email data including transactional information indicating a status of the email data;
a receipt generator, coupled to the filter, for generating receipt data identifying the email data that should not be forwarded;
a data transmitter, coupled to the filter, for forwarding the receipt data via a computer network to a datastore associated with the server; and
a client configuration engine configured to compare the filter control data stored on the client personal computer with filter control data stored on the server and configured to synchronize the filter control data stored on the client personal computer to the filter control data stored on the server when a difference is detected therebetween,
wherein the transactional information includes information indicating the email as at least one of created email, forwarded email, replied to email and deleted email.

24. The system of claim 23, wherein the client personal computer is protected by a firewall.

* * * * *